(12) United States Patent
Merzhaeuser et al.

(10) Patent No.: US 11,795,907 B2
(45) Date of Patent: Oct. 24, 2023

(54) JOINTED WIND TURBINE ROTOR BLADE HAVING SPAR CAP CONSTRUCTED OF VARYING FORMS OF MATERIALS ALONG ITS SPAN

(71) Applicant: General Electric Company, Schenectady, NY (US)

(72) Inventors: Thomas Merzhaeuser, Munich (DE); Andrew Mitchell Rodwell, Greenville, SC (US); Scott Jacob Huth, Greenville, SC (US); Aaron A. Yarbrough, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/415,949

(22) PCT Filed: Dec. 20, 2018

(86) PCT No.: PCT/US2018/066779
§ 371 (c)(1),
(2) Date: Jun. 18, 2021

(87) PCT Pub. No.: WO2020/131067
PCT Pub. Date: Jun. 25, 2020

(65) Prior Publication Data
US 2022/0065220 A1 Mar. 3, 2022

(51) Int. Cl.
*F03D 1/06* (2006.01)
*B29D 99/00* (2010.01)
*B29L 31/08* (2006.01)

(52) U.S. Cl.
CPC ....... *F03D 1/0675* (2013.01); *B29D 99/0025* (2013.01); *B29L 2031/085* (2013.01); *F05B 2240/302* (2013.01); *F05B 2260/30* (2013.01)

(58) Field of Classification Search
CPC ................. F03D 1/0675; F03D 1/0683; F05B 2240/302; F05B 2280/6001;
(Continued)

(56) References Cited

U.S. PATENT DOCUMENTS

| 851,196 A | 4/1907 | Bevans et al. |
| 4,474,536 A | 10/1984 | Gougeon et al. |

(Continued)

FOREIGN PATENT DOCUMENTS

| EP | 2186622 A1 | 5/2010 |
| EP | 3098440 A1 | 11/2016 |

(Continued)

OTHER PUBLICATIONS

International Search Report & Opinion Corresponding to PCT/US2018/066779 dated Aug. 27, 2019.

*Primary Examiner* — Courtney D Heinle
*Assistant Examiner* — Sang K Kim
(74) *Attorney, Agent, or Firm* — Dority & Manning, P.A.

(57) ABSTRACT

A rotor blade for a wind turbine includes first and second blade segments extending in opposite directions from a chord-wise joint. Each of the first and second blade segments has at least one shell member defining an airfoil surface and an internal support structure. The first blade segment includes a beam structure extending lengthwise that structurally connects with the second blade segment at a receiving section. At least one of the internal support structures of the first and second blade segments includes at least one spar cap. The rotor blade also includes one or more pin joints positioned on the spar cap(s) for connecting the blade segments. The spar cap is constructed of varying forms of materials along a span of the rotor blade, including at least two of: one or more infused composite laminates, one or more pre-preg composite laminates, one or more pre-fabri- (Continued)

cated or pre-cured composite elements, one or more additively-manufactured structures, or one or more non-composite structural solids.

11 Claims, 6 Drawing Sheets

(58) Field of Classification Search
CPC ...... F05B 2280/6002; F05B 2280/6003; F05B 2280/6013
See application file for complete search history.

(56) References Cited

U.S. PATENT DOCUMENTS

| | | | |
|---|---|---|---|
| 4,643,646 | A | 2/1987 | Hahn et al. |
| 4,732,542 | A | 3/1988 | Hahn et al. |
| 5,281,454 | A | 1/1994 | Hanson |
| 6,843,953 | B2 | 1/2005 | Filsinger et al. |
| 7,334,989 | B2 | 2/2008 | Arelt |
| 7,344,360 | B2 | 3/2008 | Wetzel |
| 7,901,188 | B2 | 3/2011 | Llorente Gonzalez et al. |
| 7,922,454 | B1 * | 4/2011 | Riddell ................ F03D 1/0675 416/224 |
| 7,927,077 | B2 | 4/2011 | Olson |
| 7,997,874 | B2 | 8/2011 | van der Bos |
| 7,998,303 | B2 | 8/2011 | Baehmann et al. |
| 8,123,488 | B2 | 2/2012 | Finnigan et al. |
| 8,297,932 | B2 | 10/2012 | Arocena De La Rua et al. |
| 8,348,622 | B2 | 1/2013 | Bech |
| 8,356,982 | B2 | 1/2013 | Petri Larrea et al. |
| 8,376,713 | B2 | 2/2013 | Kawasetsu et al. |
| 8,388,316 | B2 | 3/2013 | Arocena De La Rua et al. |
| 8,517,689 | B2 | 8/2013 | Kyriakides et al. |
| 8,919,754 | B2 | 12/2014 | Schibsbye |
| 9,169,825 | B2 * | 10/2015 | Auberon ................ F03D 1/0675 |
| 9,669,589 | B2 | 6/2017 | Zamora Rodriguez et al. |
| 10,451,030 | B2 * | 10/2019 | Hayden ................ B29C 70/00 |
| 2007/0018049 | A1 | 1/2007 | Stuhr |
| 2007/0253824 | A1 | 11/2007 | Eyb |
| 2008/0206062 | A1 | 8/2008 | Sanz Pascual et al. |
| 2009/0116962 | A1 | 5/2009 | Pedersen et al. |
| 2009/0155084 | A1 | 6/2009 | Livingston et al. |
| 2009/0162208 | A1 | 6/2009 | Zirin et al. |
| 2010/0132884 | A1 | 6/2010 | Baehmann et al. |
| 2010/0215494 | A1 | 8/2010 | Bech et al. |
| 2010/0304170 | A1 | 12/2010 | Frederiksen |
| 2011/0052403 | A1 | 3/2011 | Kawasetsu et al. |
| 2011/0081247 | A1 | 4/2011 | Hibbard |
| 2011/0081248 | A1 | 4/2011 | Hibbard |
| 2011/0091326 | A1 | 4/2011 | Hancock |
| 2011/0158788 | A1 | 6/2011 | Bech et al. |
| 2011/0158806 | A1 | 6/2011 | Arms et al. |
| 2011/0229336 | A1 | 9/2011 | Richter et al. |
| 2012/0093627 | A1 | 4/2012 | Christenson et al. |
| 2012/0141284 | A1 | 6/2012 | Auberon et al. |
| 2012/0196079 | A1 | 8/2012 | Brauers et al. |
| 2012/0213642 | A1 | 8/2012 | Wang et al. |
| 2012/0269643 | A1 | 10/2012 | Hibbard et al. |
| 2012/0308396 | A1 | 12/2012 | Hibbard |
| 2013/0040151 | A1 | 2/2013 | Jeromerajan et al. |
| 2013/0064663 | A1 | 3/2013 | Loth et al. |
| 2013/0129518 | A1 | 5/2013 | Hayden et al. |
| 2013/0164133 | A1 | 7/2013 | Grove-Nielsen |
| 2013/0177433 | A1 | 7/2013 | Fritz et al. |
| 2013/0189112 | A1 | 7/2013 | Hedges et al. |
| 2013/0189114 | A1 | 7/2013 | Jenzewski et al. |
| 2013/0219718 | A1 | 8/2013 | Busbey et al. |
| 2013/0224032 | A1 | 8/2013 | Busbey et al. |
| 2013/0236307 | A1 | 9/2013 | Stege |
| 2013/0236321 | A1 | 9/2013 | Olthoff |
| 2014/0286780 | A1 | 9/2014 | Lemos et al. |
| 2015/0204200 | A1 | 7/2015 | Eyb et al. |
| 2015/0369211 | A1 * | 12/2015 | Merzhaeuser .......... F03D 80/30 416/61 |
| 2018/0156202 | A1 | 6/2018 | Lipka et al. |
| 2018/0298879 | A1 * | 10/2018 | Johnson ................ B29C 65/002 |

FOREIGN PATENT DOCUMENTS

| | | | |
|---|---|---|---|
| EP | 3144526 | A1 | 3/2017 |
| FR | 2710871 | A1 | 4/1995 |
| GB | 2477847 | A | 8/2011 |
| WO | WO2009/034291 | A2 | 3/2009 |
| WO | WO2009/077192 | A2 | 6/2009 |
| WO | WO2010/023299 | A2 | 3/2010 |
| WO | WO2011/064553 | A2 | 6/2011 |
| WO | WO2011/066279 | A2 | 6/2011 |
| WO | WO2015/051803 | A1 | 4/2015 |
| WO | WO2015/185066 | A1 | 12/2015 |

* cited by examiner

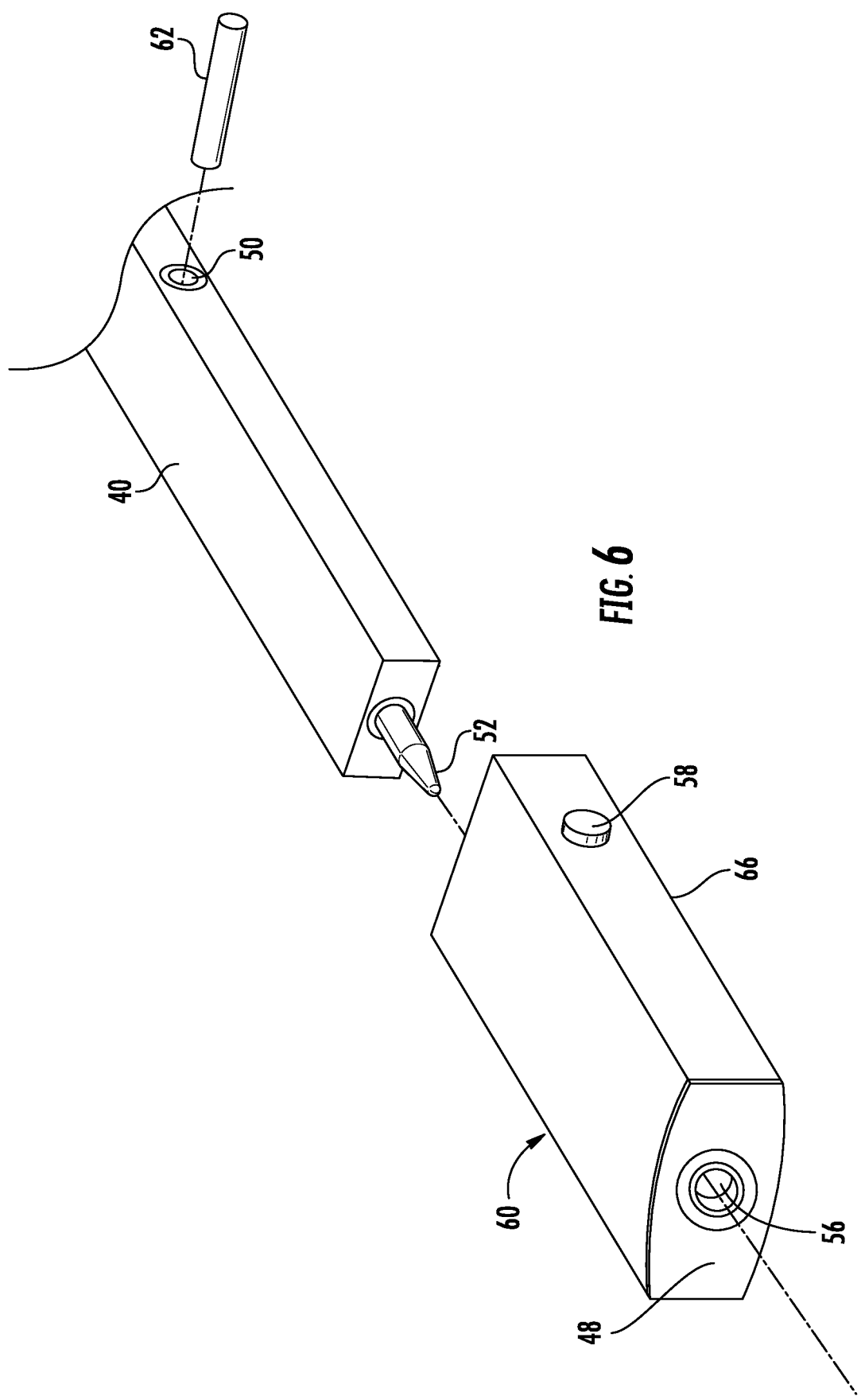

ions used, the entirety of the spar cap is constructed of pultrusions. In view of the foregoing, a jointed rotor blade for a wind turbine having a spar cap constructed of varying forms of materials that can be chosen based on different design selection criteria would be welcomed in the art.

JOINTED WIND TURBINE ROTOR BLADE HAVING SPAR CAP CONSTRUCTED OF VARYING FORMS OF MATERIALS ALONG ITS SPAN

FIELD

The present disclosure relates generally to wind turbines, and more particularly to jointed rotor blades for wind turbines having spar caps constructed of varying forms of materials.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves.

In recent years, wind turbines for wind power generation have increased in size to achieve improvement in power generation efficiency and to increase the amount of power generation. Along with the increase in size of wind turbines for wind power generation, wind turbine rotor blades have also increased in size. As such, various difficulties, such as a difficulty in integral manufacture and transportation difficulties, may occur in wind turbine rotor blades.

One known strategy for reducing the complexity and costs associated with pre-forming, transporting, and erecting wind turbines having rotor blades of increasing sizes is to manufacture the rotor blades in blade segments. The blade segments may then be assembled to form the rotor blade after, for example, the individual blade segments are transported to the field.

Typical spar caps and shear webs are constructed of a single form or kind of composite material along the entire length of the component. For example, where pultrusions are used, the entirety of the spar cap is constructed of pultrusions. In view of the foregoing, a jointed rotor blade for a wind turbine having a spar cap constructed of varying forms of materials that can be chosen based on different design selection criteria would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments has at least one shell member defining an airfoil surface and an internal support structure. The first blade segment includes a beam structure extending lengthwise that structurally connects with the second blade segment at a receiving section. At least one of the internal support structures of the first and second blade segments include at least one spar cap. The rotor blade also includes one or more pin joints positioned on the spar cap(s) for connecting the first and second blade segments. Further, the spar cap is constructed of varying forms of materials along a span of the rotor blade. More specifically, the varying forms of materials include at least two of the following: one or more infused composite laminates, one or more pre-preg composite laminates, one or more pre-fabricated or pre-cured composite elements, one or more additively-manufactured structures, or one or more non-composite structural solids.

In one embodiment, the pin joint(s) may be embedded in a first material form of the varying forms of materials. In such embodiments, the first material form of the varying forms of materials may include the pultruded profile(s), whereas remaining portions of the spar cap(s) may be constructed of the fabric(s).

In another embodiment, the non-composite structural solid(s) may include, for example, extrusions, castings, forgings, injection moldings, machined forms, or similar. In further embodiments, the pre-fabricated or pre-cured composite element(s) may include one or more pultruded profiles or one or more fabrics. More specifically, in one embodiment, the pultruded profiles may include, for example, pultruded plates and/or pultruded rods. In addition, the fabric(s) may include glass fibers, carbon fibers, polymer fibers, wood fibers, bamboo fibers, ceramic fibers, nanofibers, metal fibers, or combinations thereof.

In further embodiments, the fabric(s) may be provided at one or more tapering areas of the spar cap(s). In such embodiments, the tapering areas of the spar cap(s) may be located within about 25% of the span of the rotor blade from a blade tip thereof.

In addition, in certain embodiments, one or more of the varying forms of materials may be constructed, at least in part, of at least one resin material. In such embodiments, the resin material may include a thermoset resin or a thermoplastic resin.

In another aspect, the present disclosure is directed to a method for manufacturing a rotor blade of a wind turbine. The method includes forming at least one blade segment of the rotor blade. The blade segment(s) includes at least one shell member defining an airfoil surface. The method also includes forming an internal support structure for the blade segment having at least one spar cap. The spar cap(s) is formed using varying forms of materials along a span of the rotor blade. The varying forms of materials include at least two of the following: one or more infused composite laminates, one or more pre-preg composite laminates, one or more pre-fabricated or pre-cured composite elements, one or more additively-manufactured structures, or one or more non-composite structural solids. Further, the method includes securing the internal support structure to the at least one blade segment.

In one embodiment, forming the internal support structure for the blade segment(s) having the spar cap(s) may include evaluating design criteria for the spar cap(s) along the span and determining the varying forms of materials based on the design criteria. In such embodiments, the design criteria may include, for example, cost, weight, mechanical properties, manufacturability, and/or derivatives or combinations thereof.

It should be further understood that the method may further include any of the additional features and/or steps described herein. In addition, forming the blade segment(s) of the rotor blade may include forming first and second blade segments, arranging the first and second blade segments in opposite directions from a chord-wise joint, and securing the first and second blade segments together via one or more pin joints. Thus, in such embodiments, the varying forms of materials along the span of the rotor blade may include the pultruded profile(s) at locations of the pin joint(s) at the chord-wise joint and the fabric(s) in remaining portions of the spar cap(s).

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 illustrates an exploded perspective view of one embodiment of the multiple supporting structures of the assembly of the rotor blade of the wind turbine according to the present disclosure;

DETAILED DESCRIPTION

Figure 1:
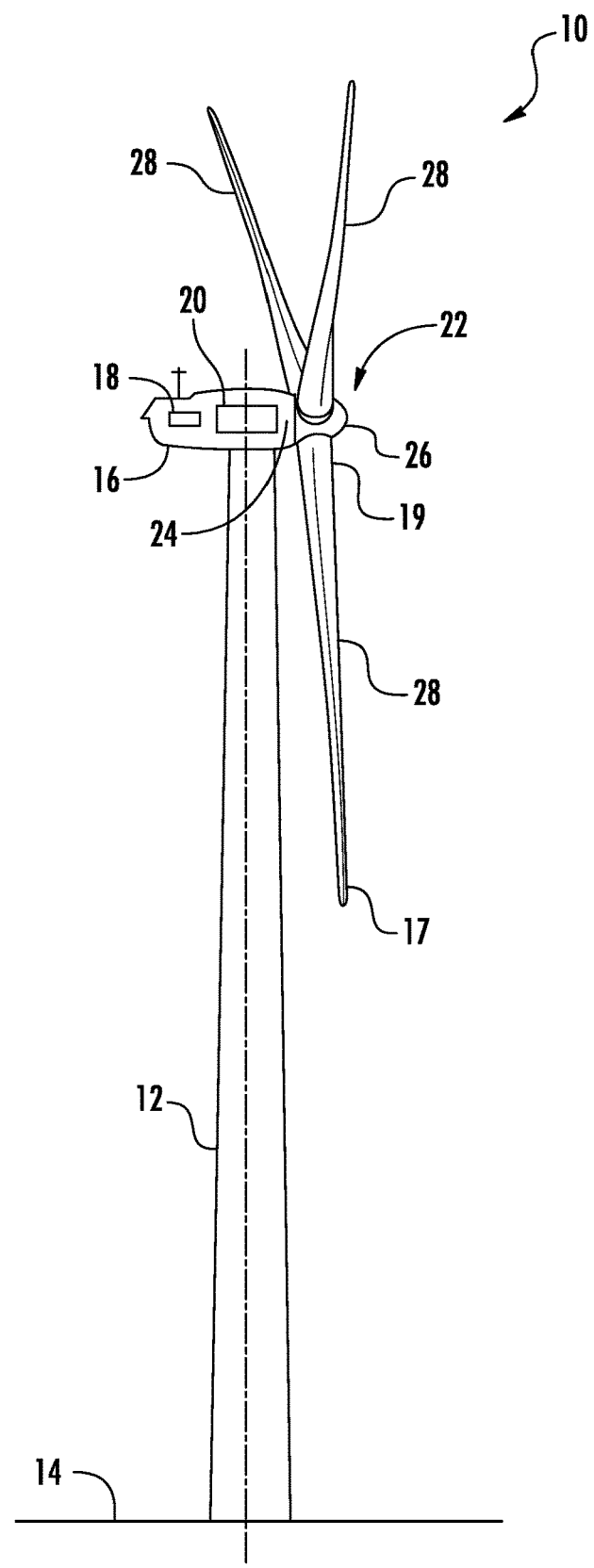
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
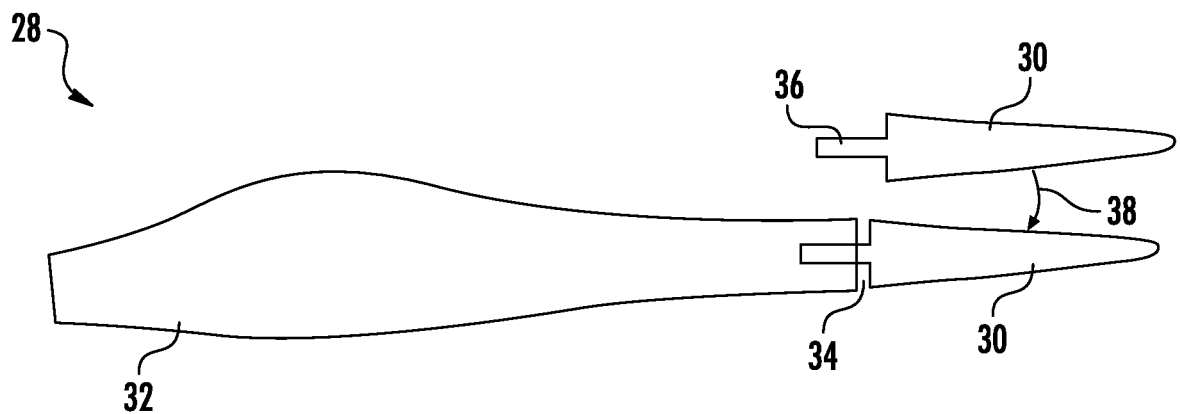
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include at least one shell member, such as a pressure side shell member, a suction side shell member, a leading edge shell member, a trailing edge shell member and so on. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32. In addition, as shown, the second blade segment includes multiple spar structures 66 (also referred to herein as spar caps) that extend lengthwise for connecting with the beam structure 40 of the first blade segment 30 (which is shown in more detail in FIGS. 3 and 5). As used herein, a spar cap generally refers to a structural feature, generally symmetrical around the maximum thickness of the airfoil, wherein the stiffness of the material is substantially biased in the span-wise direction and the stiffness is substantially greater than the stiffness of an adjacent shell. As such, the spar cap(s) can be separate from, bonded to, or integral with a shell or transition therebetween.

Figure 3:
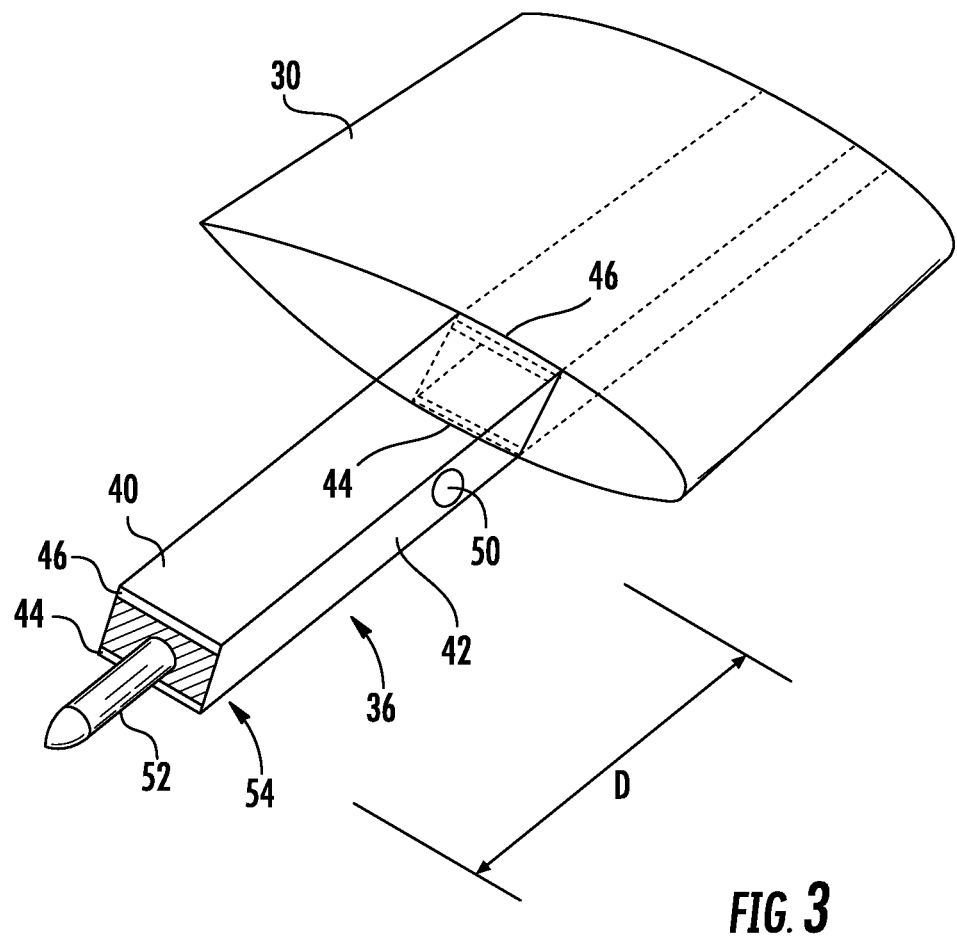
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms at least a part of a shear web 42 connected with a suction side spar cap 44 and a pressure side spar cap 46.

Moreover, as shown, the first blade segment 30 may include one or more first pin joints at a receiving end 54 of the beam structure 40. In one embodiment, the pin joint may include a pin that is in a tight interference fit with a bushing. More specifically, as shown, the pin joint(s) may include one pin tube 52 located on the receiving end 54 of the beam structure 40. Thus, as shown, the pin tube 52 may be oriented in a span-wise direction, i.e. along the span or length of the rotor blade 28 which is defined along an axis that extends from the blade root to the blade tip of the rotor blade 28. Further, the first blade segment 30 may also include a pin joint slot 50 located on the beam structure 40. Moreover, as shown, the pin joint slot 50 may be oriented in a chord-wise direction, i.e. along a chord of the rotor blade 28 which is defined along an axis that extends from the leading edge to the trailing edge of the rotor blade 28.

Figure 4:
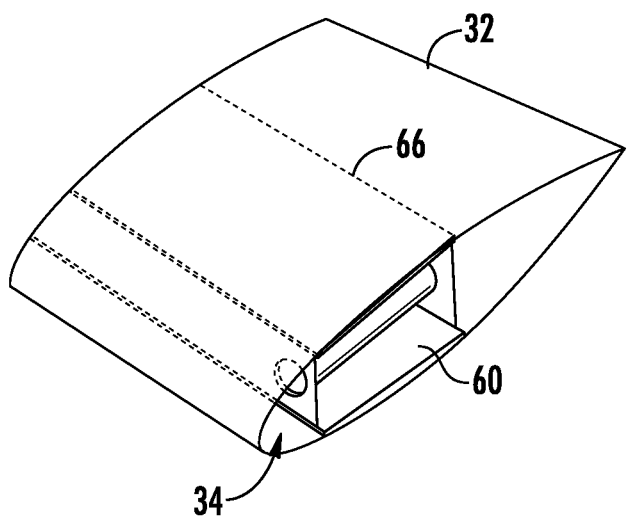
FIG. 4 illustrates a perspective view of one embodiment of a section of the second blade segment at the chord-wise joint according to the present disclosure.

Referring now to FIG. 4, a perspective view of a section of the second blade segment 32 according to the present disclosure is illustrated. As shown, the second blade segment 32 includes a receiving section 60 extending lengthwise within the second blade segment 32 for receiving the beam structure 40 of the first blade segment 30. Further, as shown, the receiving section 60 may include the spar structures 66 that extend lengthwise for connecting with the beam structure 40 of the first blade segment 30. In addition, as shown, the receiving section 60 may include a chord-wise member 48 having a span-wise pin joint slot 56 defined therethrough. Moreover, as shown, the receiving section 60 may include a chord-wise pin joint slot 58 defined therethrough that aligns with the pin joint slot 50 of the beam structure 40.

Figure 5:
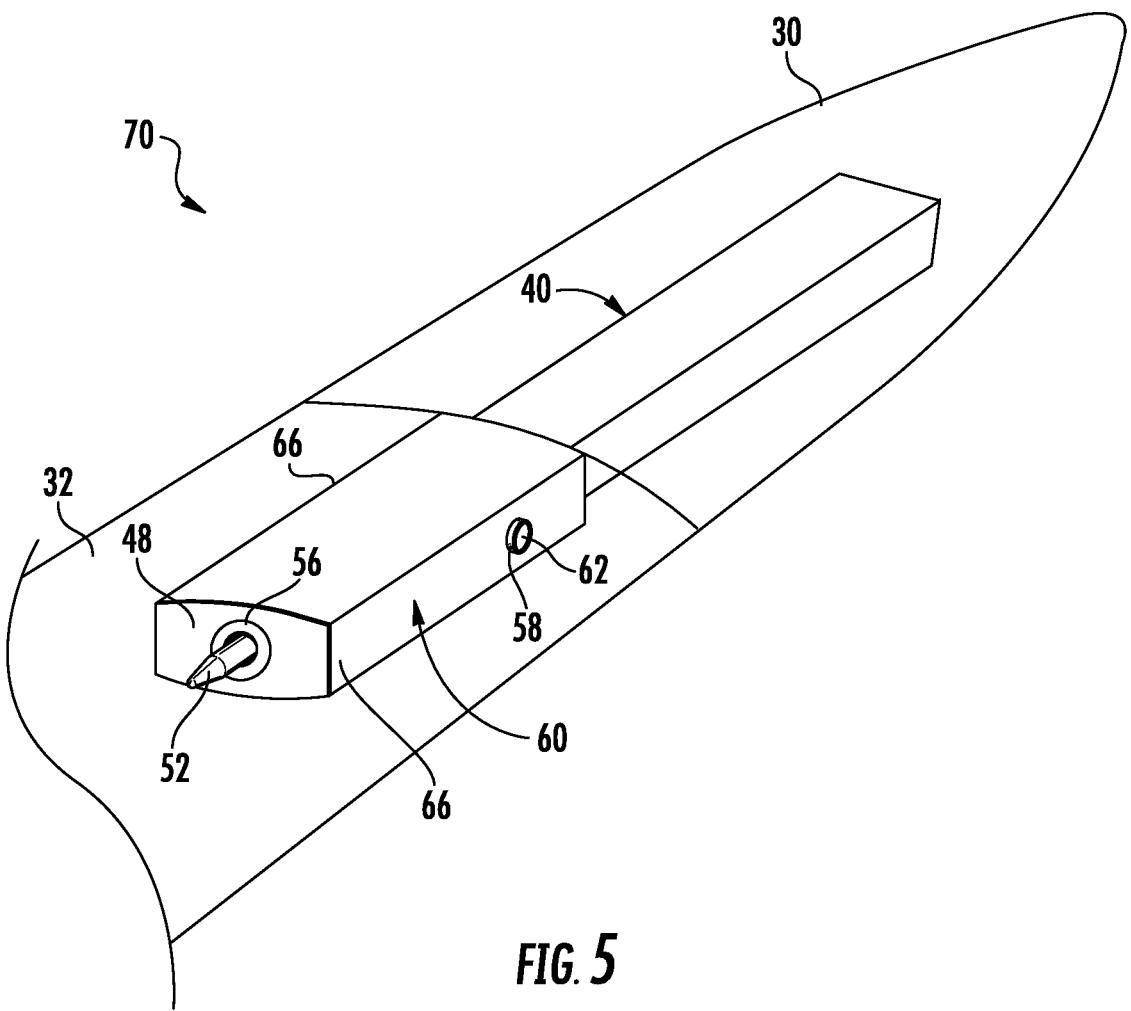
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28. More specifically, as shown, the span-wise extending pin 52 of the receiving end 54 of the beam structure 40 is received within the span-wise pin joint slot 56 of the receiving section 60 so as to secure the first and second blade segments 30, 32 together. In addition, as shown, each of the beam structure 40 and the receiving section 60 may define spar caps 44, 46, respectively, of the rotor blade 28.

Referring now to FIG. 6, an exploded perspective view of the multiple supporting structures of the assembly 70 towards the blade tip of the rotor blade 28 is illustrated. As shown, the receiving section 60 is configured to receive the beam structure 40 and may include the chord-wise pin joint slot 58 that aligns with the pin joint slot 50 of the beam structure 40 through which a chord-wise extending pin 62 may be inserted. Further, as shown, the chord-wise extending pin 62 may be configured to remain in a tight interference fit within the aligning pin joint slots 50, 58 such that the receiving section 60 and the beam structure 40 are joined together during assembly. Further, FIG. 6 also illustrates the chord-wise member 48 that includes the pin joint slot 56 configured for receiving the pin tube 52 of the beam structure 40. As such, the pin tube 52 is configured to form a tight interference fit joint.

Referring now to FIGS. 7A-7E, the spar caps 44, 46 of the rotor blade 28 described herein may be constructed of varying material forms along a span of the rotor blade 28. More specifically, as shown, the varying forms of materials may include at least two of the following: one or more infused composite laminates 76, one or more pre-preg composite laminates 78, one or more pre-fabricated or pre-cured composite elements 74, one or more additively-manufactured structures 84, and/or one or more non-composite structural solids 86. In addition, as shown, the pre-fabricated or pre-cured composite element(s) 76 may include, for example, one or more pultruded profiles 74 and/or one or more fabrics 72.

Figure 7A:
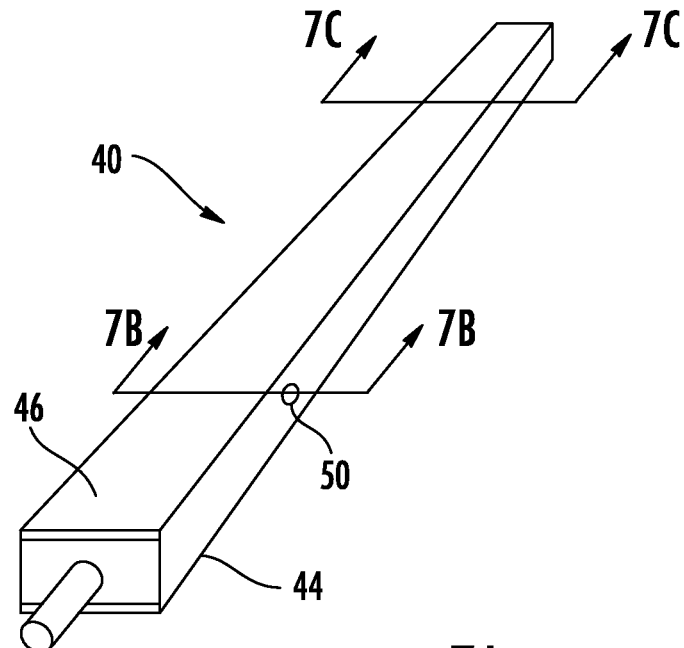
FIG. 7A illustrates a perspective view of one embodiment of a beam structure having pressure and suction side spar caps formed according to the present disclosure.
Figure 7B:
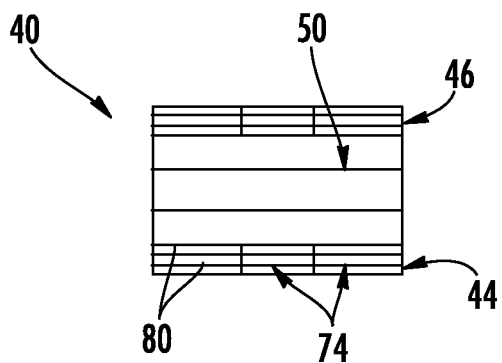
FIG. 7B illustrates a cross-sectional view of the beam structure of FIG. 7A along section line 7B according to the present disclosure.
Figure 7C:
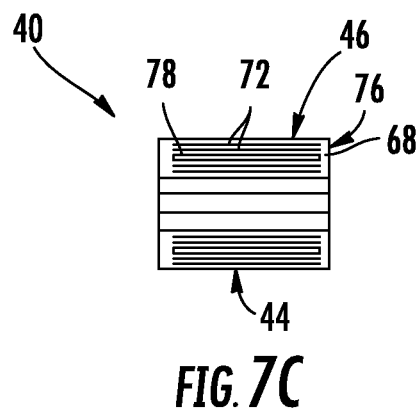
FIG. 7C illustrates a cross-sectional view of the beam structure of FIG. 7A along section line 7C according to the present disclosure.
Figure 7D:
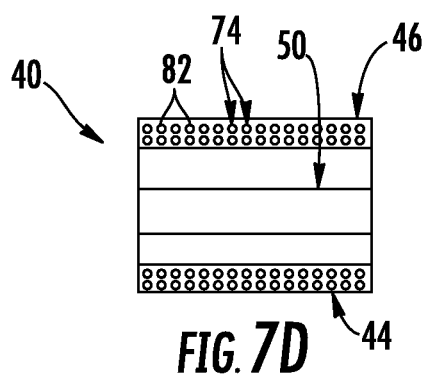
FIG. 7D illustrates a cross-sectional view of another embodiment of a beam structure having pressure and suction side spar caps formed according to the present disclosure.

For example, as shown in FIGS. 7A and 7B, the pin joint(s) (particularly pin joint slot 50) may be embedded in a first material form of the varying forms of materials. More particularly, as shown in FIGS. 7B and 7D, the first material form of the varying forms of materials may include a plurality of the pultruded profile(s) 74. For example, as shown in FIG. 7B, the pultruded profiles 74 include a plurality of pultruded plates 80, whereas FIG. 7D illustrates a plurality of pultruded rods 82. Thus, in such embodiments, the areas containing the pin joints (i.e. areas of high stress) benefit from the use of pultruded profiles, which allow a wave-free handling and layup of the material.

Other areas of the spar caps 44, 46 may benefit from the use of fabrics due to the need the taper the width of the spar cap towards the blade tip 17, thereby allowing hassle-free cutting of the material. For example, as shown in FIG. 7C, remaining portions of the spar cap(s) 44, 46 may be constructed, at least in part, of one or more dry fabric(s) 72 optionally cured within a resin material 68 to form the infused composite laminate 76. In such embodiments, the dry fabric(s) 72 may be provided at one or more tapering areas of the spar cap(s) 44, 46. For example, as shown, the tapering area(s) of the illustrated spar caps 44, 46 may be located within about 25% of the span of the rotor blade 28 from the blade tip 17. In addition, the dry fabric(s) may include glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other another suitable direction and/or combinations thereof.

Figure 7E:
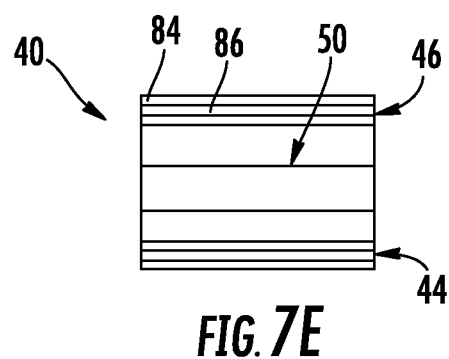
FIG. 7E illustrates a cross-sectional view of yet another embodiment of a beam structure having pressure and suction side spar caps formed according to the present disclosure.

In further embodiments, as shown in FIG. 7E, the spar caps 44, 46 may also benefit from being formed of one or more additively-manufactured structures 84 and/or one or more non-composite structural solids 86. As used herein, the additively-manufactured structures 84 are generally formed using automated deposition of materials via technologies such as additive manufacturing, 3-D Printing, spray deposition, extrusion additive manufacturing, automated fiber deposition, as well as other techniques that utilize computer numeric control and multiple degrees of freedom to deposit material. Further, the non-composite structural solid(s) 86 may include extrusions, castings, forgings, injection moldings, machined forms, or similar.

The resin material 68 described herein may include, for example, a thermoset resin or a thermoplastic resin. The thermoplastic materials as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Figure 8:
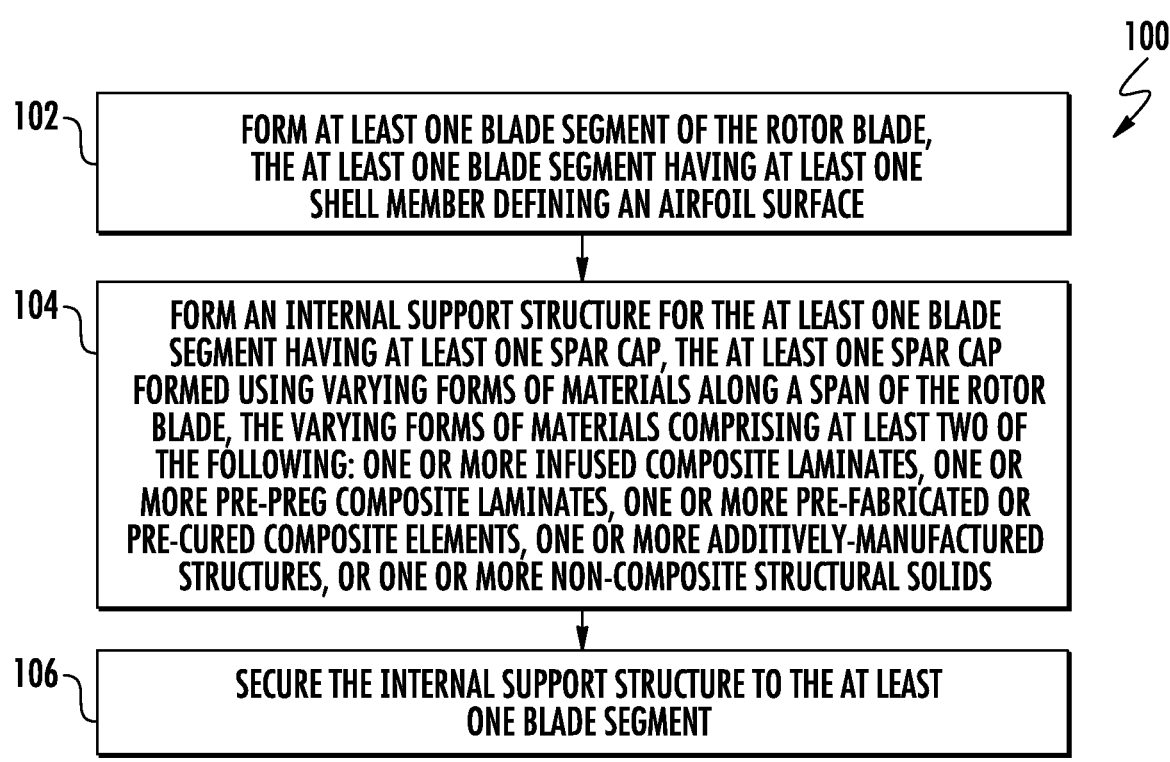
FIG. 8 illustrates a flow chart of one embodiment of a method for manufacturing a rotor blade of a wind turbine according to the present disclosure.

Referring now to FIG. 8, a flow chart 100 of a method for manufacturing a rotor blade of a wind turbine according to the present disclosure is illustrated. In general, the method 100 will be described herein with reference to the wind turbine 10 and the rotor blade 28 shown in FIGS. 1-7D. However, it should be appreciated that the disclosed method 100 may be implemented with rotor blades having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include forming at least one blade segment of the rotor blade 28 having at least one shell member defining an airfoil surface. For example, in one embodiment, the method 100 may include forming first and second blade segments 30, 32, arranging the first and second blade segments 30, 32 in opposite directions from the chord-wise joint 34, and securing the first and second blade segments 30, 32 together via one or more pin joints.

As shown at (104), the method 100 may include forming an internal support structure for the blade segment having at least one spar cap 44, 46. For example, in one embodiment, the method 100 may include evaluating design criteria for the spar cap(s) 44, 46 along the span and determining a desired form of material to be used at various span locations of the rotor blade 28 based on the design criteria. In such embodiments, the design criteria may include, for example, cost, weight, mechanical properties, manufacturability, and/or derivatives or combinations thereof. Thus, the spar caps 44, 46 described herein are formed using varying forms of materials along the span of the rotor blade 28. More specifically, in certain embodiments, the varying forms of materials may include at least two of the following: one or more infused composite laminates, one or more pre-preg composite laminates, one or more pre-fabricated or pre-cured composite elements, one or more additively-manufactured structures, or one or more non-composite structural solids. For example, in one embodiment, the varying forms of materials along the span of the rotor blade 28 may include the pultruded profile(s) 74 at locations of the pin joint(s) and the fabric(s) 72 (or composite laminate 76) in remaining portions of the spar cap(s) 44, 46.

Still referring to FIG. 8, as shown at (106), the method 100 may then include securing the internal support structure 40, 60 to the blade segment(s) 30, 32. Thus, the final rotor blade 28 includes a spar cap with varying materials along its span to accommodate the varying design criteria thereof.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
a first blade segment and a second blade segment extending in opposite directions from a chord-wise joint, each of the first and second blade segments comprising at least one shell member defining an airfoil surface and an internal support structure, the first blade segment comprising a beam structure extending lengthwise that structurally connects with the second blade segment at a receiving section, wherein the beam structure of the first blade segment comprises at least one spar cap and a shear web connected with the at least one spar cap; and at least one chord-wise extending pin joint and at least one span-wise extending pin joint integral with the at least one spar cap for connecting the first and second blade segments, wherein at least one spar cap comprises varying forms of materials along a span of the rotor blade, the varying forms of materials comprising at least, a first material form and a different, second material form, the first and second materials forms being at different span-wise locations of the rotor blade, wherein at least one pin joint slot is embedded in the first material form of the varying forms of materials for receiving the at least one chord-wise pin joint or the at least one span-wise pin joint, wherein the first material form comprises one or more pultruded profiles, the one or more pultruded profiles being provided at locations of the at least one pin joint slot, wherein the second material form comprises one or more infused composite laminates comprising one or more dry fabrics cured within at least one resin material, the one or more dry fabrics provided at remaining portions of the at least one spar cap to include one or more tapering areas of the at least one spar cap towards a blade tip of the rotor blade.

2. The rotor blade of claim 1, wherein the one or more dry fabrics comprise at least one of glass fibers, carbon fibers, polymer fibers, wood fibers, bamboo fibers, ceramic fibers, nanofibers, metal fibers, or combinations thereof.

3. The rotor blade of claim 1, wherein the one or more tapering areas of the at least one spar cap are located within 25% of the span of the rotor blade from the blade tip.

4. The rotor blade of claim 1, wherein the one or more pultruded profiles comprise at least one of pultruded plates or pultruded rods.

5. The rotor blade of claim 1, wherein the at least one resin material comprises at least one of a thermoset resin or a thermoplastic resin.

6. A method for manufacturing a rotor blade of a wind turbine, the method comprising:

forming at least one blade segment of the rotor blade, the at least one blade segment having at least one shell member defining an airfoil surface;

forming an internal support structure for the at least one blade segment, the at least one blade segment having at least one spar cap and a shear web connected with the at least one spar cap, the at least one spar cap formed using varying forms of materials along a span of the rotor blade, the varying forms of materials comprising, at least, a first material form and a different, second material form, the first and second materials forms being at different span-wise locations of the rotor blade;

embedding at least one pin joint slot in the first material form of the varying forms of materials; and securing the internal support structure to the at least one blade segment by inserting at least one chord-wise pin or at least one span-wise pin into the at least one pin joint slot;

wherein the first material form comprises one or more pultruded profiles, the one or more pultruded profiles being provided at locations of the at least one pin joint slot, wherein the second material form comprises one or more infused composite laminates comprising one or more dry fabrics cured within at least one resin material, the one or more dry fabrics provided at remaining portions of the at least one spar cap to include one or more tapering areas of the at least one spar cap towards a blade tip of the rotor blade.

7. The method of claim 6, wherein forming the internal support structure for the at least one blade segment having the at least one spar cap further comprises:

evaluating design criteria for the at least one spar cap along the span; and determining the varying forms of materials based on the design criteria.

8. The method of claim 7, wherein the design criteria comprises at least one of cost, weight, mechanical properties, manufacturability, and/or derivatives or combinations thereof.

9. The method of claim 6, wherein the one or more tapering areas of the at least one spar cap are located within 25% of the span of the rotor blade from the blade tip.

10. The method of claim 6, wherein the one or more pultruded profiles comprise at least one of pultruded plates or pultruded rods.

11. The method of claim 6, wherein the at least one resin material comprises at least one of a thermoset resin or a thermoplastic resin.

* * * * *